United States Patent [19]

Nagano et al.

[11] Patent Number: 4,799,469

[45] Date of Patent: Jan. 24, 1989

[54] APPARATUS AND METHOD FOR CONTROLLING IGNITION TIMING FOR INTERNAL COMBUSTION ENGINE

[75] Inventors: Masami Nagano; Takeshi Atago; Toshio Manaka, all of Katsuta, Japan

[73] Assignee: Hitachi, Ltd., Tokyo, Japan

[21] Appl. No.: 446

[22] Filed: Jan. 5, 1987

[30] Foreign Application Priority Data

Jan. 8, 1986 [JP] Japan .................. 61-614

[51] Int. Cl.[4] ................ F02P 5/04; F02P 5/08
[52] U.S. Cl. .................. 123/418; 123/436; 123/419
[58] Field of Search ............ 123/418, 406, 422, 423, 123/419, 436

[56] References Cited

U.S. PATENT DOCUMENTS

| | | | |
|---|---|---|---|
| 4,276,860 | 7/1981 | Capurka | 123/418 |
| 4,424,783 | 1/1984 | Kotnicki | 123/418 |
| 4,445,478 | 5/1984 | Mondyama | 123/418 |
| 4,527,523 | 7/1985 | Daumer et al. | 123/419 |
| 4,599,980 | 7/1986 | Collonia | 123/436 |

Primary Examiner—Raymond A. Nelli
Attorney, Agent, or Firm—Antonelli, Terry & Wands

[57] ABSTRACT

The ignition timing is controlled in that a change in engine speed is detected from a differentiated value $dN/dt$, and when $dN/dt$ is larger than a predetermined value and when a value of $dN/dt$ is positive, the ignition timing is retarded by a predetermined value from a fundamental ignition timing, and further, when $dN/dt$ is larger than the predetermined value and when the value of $dN/dt$ is negative, the ignition timing is advanced by the predetermined value from the fundamental ignition timing.

9 Claims, 12 Drawing Sheets

APPARATUS AND METHOD FOR CONTROLLING IGNITION TIMING FOR INTERNAL COMBUSTION ENGINE

BACKGROUND OF THE INVENTION

1. Field of the Invention

The present invention relates to an apparatus and method for controlling ignition timing for an internal combustion engine, and in particular, to such apparatus and method capable of suppressing variations in speed of the internal combustion engine.

2. Description of the Prior Art

Recently, a phenomenon of irregular vibrations has been noticed as a problem in which, in an automobile having an internal combustion engine mounted thereon, the irregular vibrations (so-called surging) are caused in the automobile when a resonant frequency determined by the internal combustion engine and the car body matches the engine rotational speed (rpm) of the internal combustion engine.

In order to eliminate this phenomenon, for example, as disclosed in U.S. Pat. No. 4,527,523, it has been proposed to control the ignition timing.

However, in the case of this U.S. Patent, since it is arranged to detect an actual engine speed (rpm) through a filter, and to compare the actual engine speed with an engine speed processed through the filter thereby to provide discrimination, it is impossible to detect a variation in the engine speed at an early time. And furthermore, since a time point at which the ignition timing is corrected and the amount of correction are not optimum, the effect of suppressing the vibrations has not been so satisfactory as expected.

SUMMARY OF THE INVENTION

It is an object of the present invention to provide an apparatus and method for controlling ignition timing of an internal combustion engine capable of obtaining a satisfactory suppressing effect of vibrations.

A characteristic feature of the present invention resides in that a rate of change of the engine speed (rpm) is obtained from a differentiated value of the engine speed, and the ignition timing is retarded by a predetermined amount when the differentiated value is larger than a predetermined value and when the sign of the differentiated value is positive, whereas the ignition timing is advanced by a predetermined amount when the sign of the differentiated value is negative.

DESCRIPTION OF THE PREFERRED EMBODIMENTS

Figure 1:
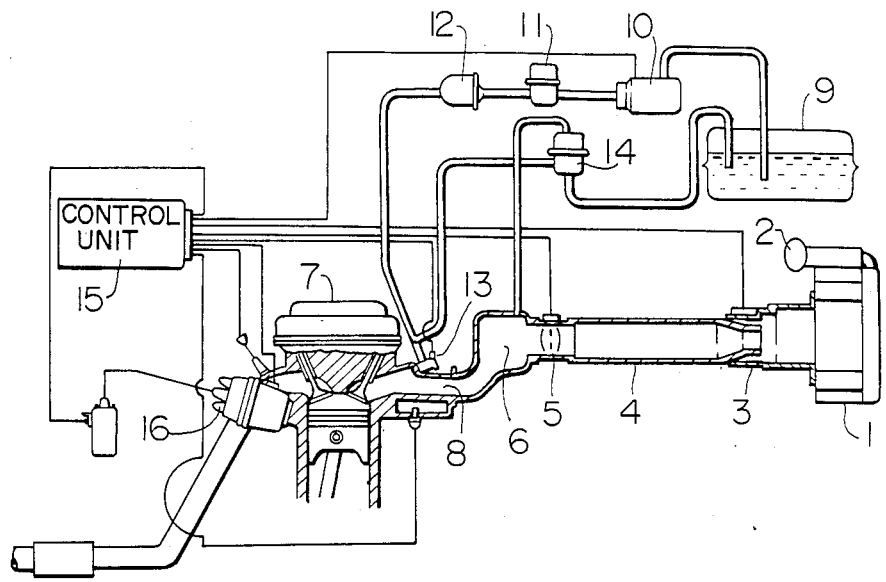
FIG. 1 is a system diagram of the present invention.

Hereinafter, embodiments of the present invention will be described. Firstly, an overall system of a fuel injection apparatus implementing the present invention will be described with reference to FIGS. 1 to 4. In FIG. 1, air is introduced from an inlet portion 2 of an air cleaner 1, and passes through a hot wire type air flow meter 3 detecting sucked air volume, a duct 4, and a throttle body 5 having a throttle valve for controlling air flow, and enters into a collector 6. Here, the air is distributed to each intake manifold 8 communicating directly with an internal combustion engine 7, and is sucked into a cylinder. On the other hand, fuel is sucked and pressured by a fuel pump 10 from a fuel tank 9, and is supplied to a fuel system including a fuel damper 11, a fuel filter 12, an injection valve 13 and a fuel regulator 14. The fuel is adjusted to a constant pressure by the fuel regulator 14, and is injected into the intake manifold 8 from the injection valve 13. Further, a signal indicative of a detected amount of air sucked therein is outputted from the air flow meter 3, and this output signal is inputted to a control unit 15. A crank angle sensor 16a is built in a distributor 16, and outputs reference signals for fuel injection timing and ignition timing as well as a signal representing a detected engine speed, and these signals are supplied to the control unit 15.

Figure 2:
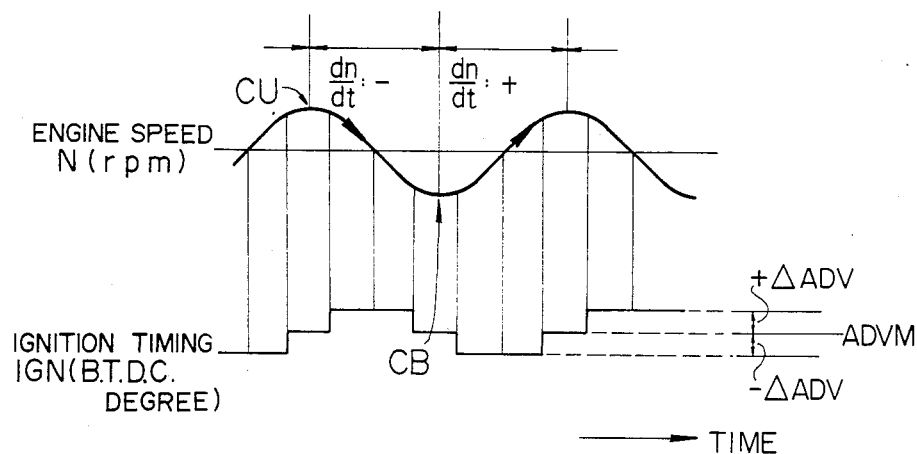
FIG. 2 is a characteristic diagram of engine speed (rpm) and ignition timing.

Next, the control of the ignition timing in accordance with the present invention will be described in detail with reference to FIGS. 2 and 3. In FIG. 2, the engine speed (rpm) is shown in the upper portion of the figure, and the behavior of the ignition timing is shown in the lower portion. In FIG. 2, the ignition timing is obtained by differentiating an amount of change in the engine speed (dN/dt) and by considering the sign of the dN/dt which indicates that when the engine speed is decreasing, the sign is negative and when it is increasing, the sign is positive. Thus, the stair-shaped curve representing the ignition timing shows that the ignition timing is retarded when the rate of change is larger than a predetermined value and the sign is positive, and the ignition timing is advanced when the sign is negative.

The control mentioned above is achieved by a basic arrangement as described below.

Figure 3:
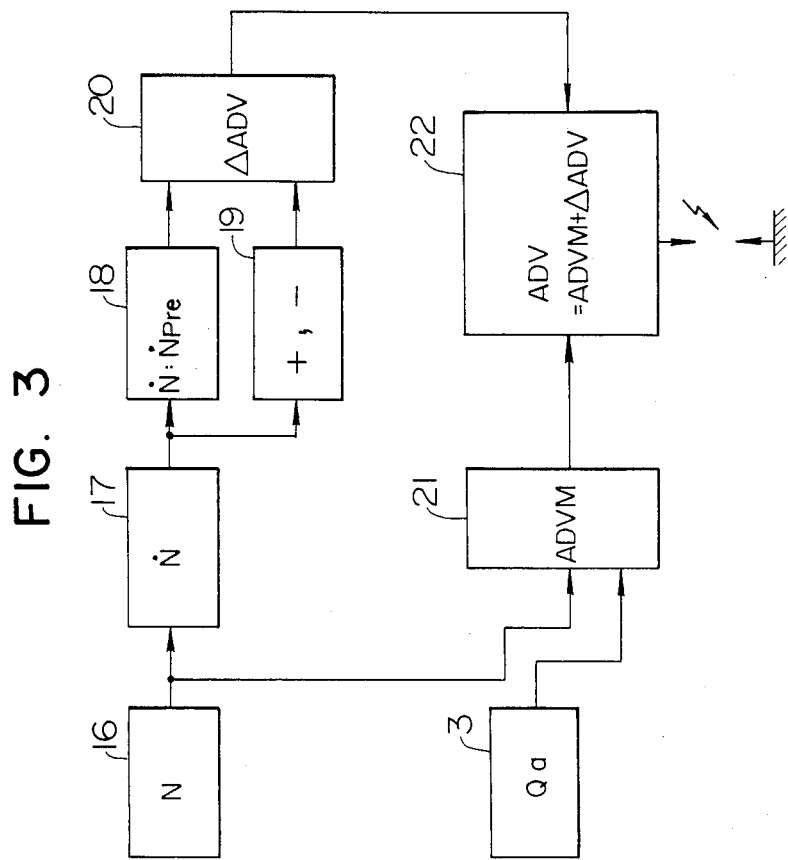
FIG. 3 is a block diagram illustrating an embodiment of the present invention.

In FIG. 3, an engine speed signal N detected by the crank angle sensor 16 is converted to a differentiated signal $\dot{N}$ in a differentiated value generating means 17. The differentiated signal $\dot{N}$ is supplied to a change rate discriminating means 18 for discriminating whether or not a change rate of the engine speed larger than a predetermined value $\dot{N}pre$ is caused or not, and is further supplied to a sign discriminating means 19 for discriminating a direction of change in the engine speed. And based on the results of both the discriminating means 18 and 19, a correction ignition timing amount $\Delta ADV$ is determined by a correction ignition timing amount determining means 20.

On the other hand, a fundamental ignition amount ADVM is obtained in a fundamental ignition timing amount determining means 21 based on the engine speed signal N and an air volume signal $Q_a$, and the correction ignition timing amount $\Delta ADV$ from the correction ignition timing amount determining means 20 and the fundamental ignition timing amount ADVM from the fundamental ignition amount determining means 21 are summed in a final ignition timing amount determining means 22 to produce a final ignition timing amount ADV.

The manner of control described above is a basic principle of the instant embodiment, and it can be performed also by using a computer.

Figure 4:
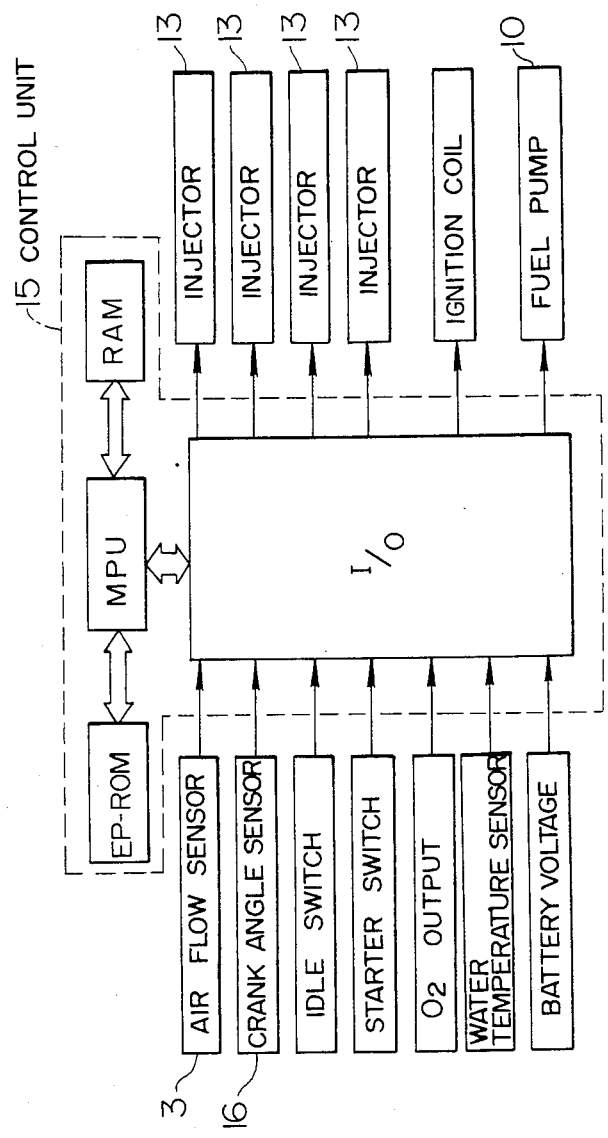
FIG. 4 is a block diagram of an arrangement of a control unit.

The control unit 15 is, as shown in FIG. 4, composed of an MPU, a RAM, a ROM, and an I/O device including an A/D converter and an input/output circuit. The control unit 15 performs predetermined computation and processing based on the output signal from the air flow meter 3 and the output signals from the crank angle sensor 16, etc., and an output signal of the control unit 15, representing the results of the computation is supplied to the fuel injection valve 13 to actuate so that a required amount of fuel is injected into each intake manifold 8. Further, it is designed to control the ignition timing by supplying a signal from the control unit 15 to a power transistor which controls a primary current of an ignition coil.

Figure 5:
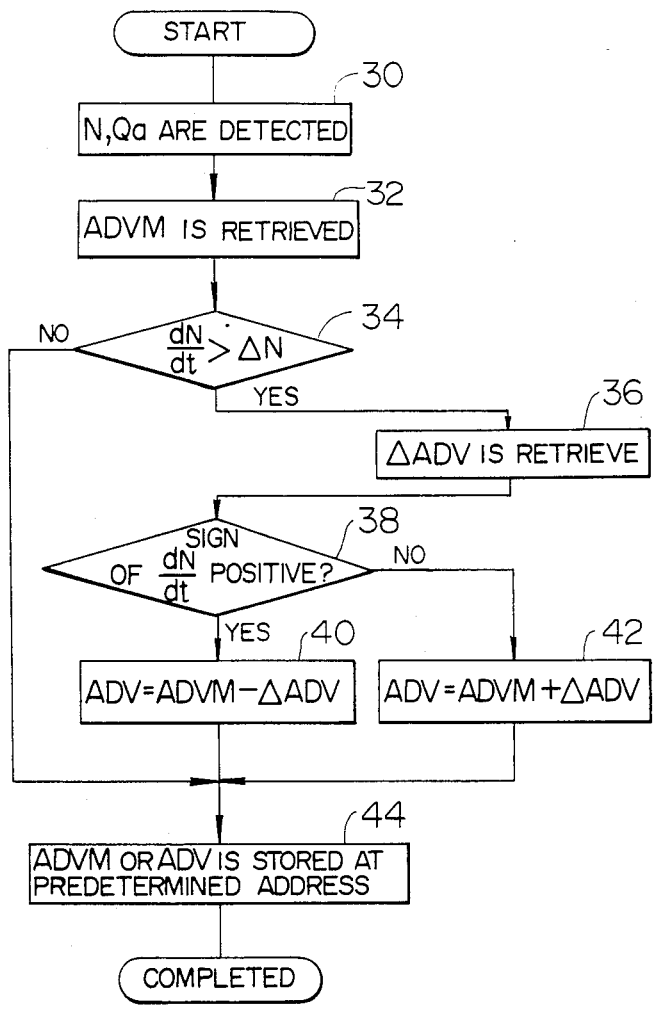
FIGS. 5 and 6 are respectively flowcharts of an embodiment of the present invention.

With reference to a flowchart of FIG. 5, the control performed in the case using such a control unit will be described.

Step 30:

An engine speed N, and an air volume $Q_a$ are detected.

Step 32:

A fundamental ignition timing amount ADVM determined by N and $Q_a$ is obtained.

This fundamental ignition timing amount ADVM has been stored in the ROM as a map.

Step 34:

A differentiated value $\dot{N}$ (=dN/dt) of the engine speed N is obtained, and it is discriminated whether this differentiated value $\dot{N}$ is larger than a predetermined value $\dot{N}pre$ (=$\Delta N$) or not.

Step 36:

When the differentiated value $\dot{N}$ is larger than $\dot{N}pre$ as discriminated in step 34, a correction ignition timing amount $\Delta ADV$ is retrieved from the ROM in this step.

Step 38:

By discriminating the sign of the differentiated value $\dot{N}$, it is discriminated whether the engine speed N is increasing or decreasing.

Steps 40 and 42:

The correction ignition timing amount $\Delta ADV$ is added to or subtracted from the fundamental ignition timing amount ADVM, and a final ignition timing amount ADV is obtained.

Step 44:

The ignition timing amount ADVM or ADV determined in the steps 32, 40, and 42 is stored in a predetermined address in the RAM.

As described above, in this embodiment, as shown in FIG. 2, in the vicinity of inflexion points CU and CB, since dN/dt is smaller than the predetermined value, the correction of the ignition timing is not carried out, and a retrieved value from the ROM is outputted as it is. When the engine speed N is decreasing and dN/dt is larger than the predetermined value, since the sign is negative, a predetermined amount is added to the retrieved value from the ROM, and the ignition timing is advanced. Further, when the engine speed is increasing and dN/dt is larger than the predetermined value, since the sign is positive, a predetermined amount is subtracted from the map-retrieved value, and the ignition timing is retarded.

Accordingly, in the vicinity of the inflexion points (FIG. 2) at which the rate of change in the engine speed is small, the correction of the ignition timing is not carried out, and instead, at a portion at which the rate of change in the engine speed is large, the ignition timing is advanced if the engine speed is decreasing thereby to increase a torque, and the ignition timing is retarded when the engine speed is increasing thereby to decrease the torque. As a result, a satisfactory effect of suppressing the vibrations can be attained.

Figure 6:
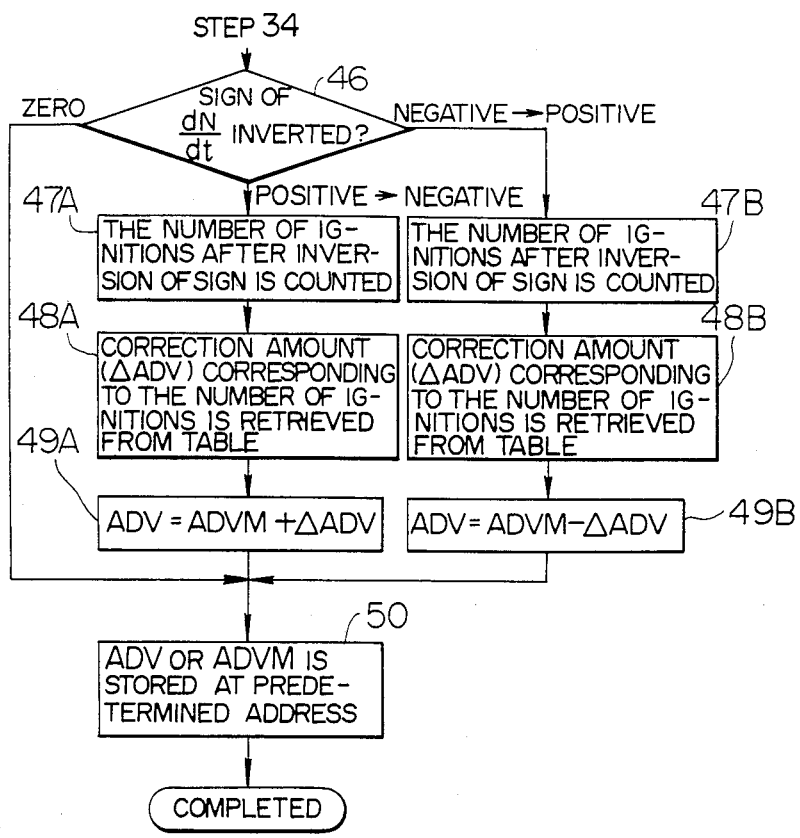

Next, a second embodiment will be described with reference to FIGS. 6 to 8.

Step 46:

After step 34, it is discriminated in step 46 by a differentiated value $\dot{N}$ (=dN/dt) whether the engine speed N has been changed from an increasing trend to a decreasing trend or vice versa.

Steps 47A and 47B:

The number of ignitions is counted from a time at which the differentiated value $\dot{N}$ is changed from a positive sign to a negative sign, or from the negative sign to the positive sign.

Steps 48A and 48B:

In correspondence to the number of ignitions determined in steps 47A or 47B, a correction ignition timing amount $\Delta ADV$ is retrieved from a table in ROM.

Figure 7:
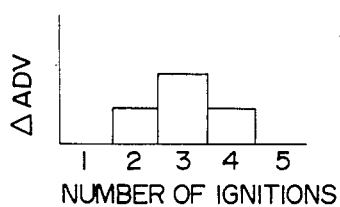
FIG. 7 is a graph of a relationship between the number of ignitions and the amount of correction.

In this table, as shown in FIG. 7, at the time of a first ignition, no correction is carried out (a retrieved value ADVM from the ROM is outputted), and the amount of correction is increased at a second ignition and is further increased at a third ignition. At a fourth ignition, the amount of correction is decreased to become equal to that at the second ignition, and no correction is effected at a fifth ignition. In this manner, the correction is carried out successively as shown in FIG. 8.

Steps 49A and 49B:

The correction ignition timing amount $\Delta ADV$ obtained in step 48A or 48B is added to or subtracted from the fundamental ignition timing amount ADVM to obtain a final ignition timing amount ADV.

Step 50:

The fundamental ignition timing amount ADVM obtained in Step 32 of the final ignition timing amount ADV obtained in Step 49A or 49B are stored at predetermined addresses of the RAM.

Figure 8:
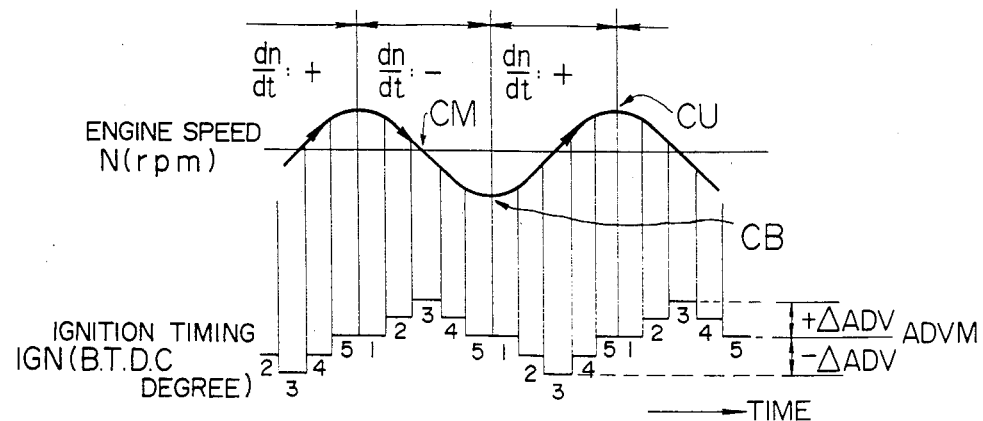
FIGS. 8, 9A and 9B are characteristic diagrams showing relationships between the engine speed and the ignition timing.

By processing as described in the foregoing, the characteristics of the engine speed and the ignition timing as shown in FIG. 8 can be obtained.

Also in this embodiment, in the vicinity of the inflexion points at which a rate of change in the engine speed is small, no correction of the ignition timing is carried out, and at portions with a large rate of change in the engine speed, the ignition timing is advanced if the engine speed is decreasing thereby to increase the torque, and the ignition timing is retarded if the engine speed is increasing thereby to enable to decrease the torque. In particular, in this embodiment, as shown in FIG. 8, a maximum correction is applied at points CM at which the differentiated value is maximum.

Next, a third embodiment will be described.

In the embodiments described in the foregoings, the ignition timing is corrected by using the correction amount and the number of corrections which are predetermined based on limited factors, even when the revolution period is changed. In contrast, the vibration suppressing effect is further improved in another embodiment which will be explained hereinafter.

The characteristic feature of this embodiment resides in that the number of corrections and the correction amount are changed in correspondence to a change in period of the revolution variation.

Figure 9A:
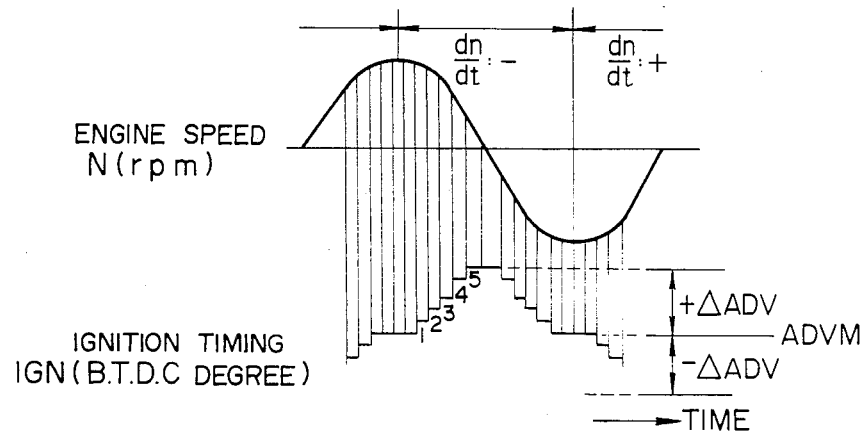
Figure 9B:
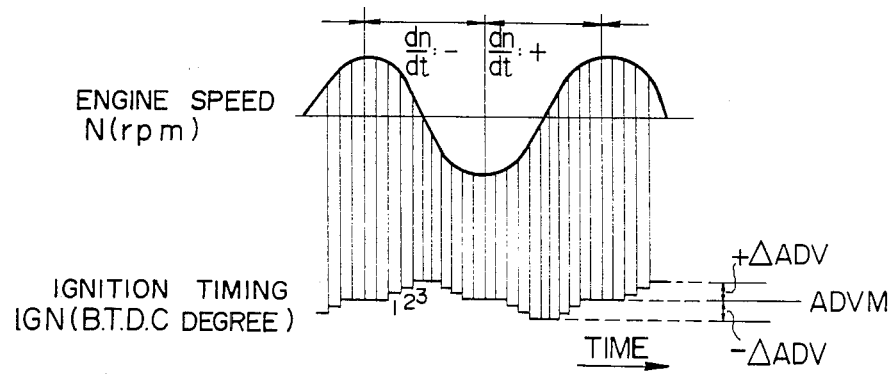

FIG. 9A shows a change in the engine speed and ignition timing when a transmission is shifted to a first gear position, and FIG. 9B shows a change in the engine speed and ignition timing when the transmission is shifted to a second gear position.

As will be seen from the figure, the variation in the period and amplitude of revolution differ between the first gear position and the second gear position of the transmission, and there is a problem in that when the number of corrections and the amount of correction are determined uniformly, surging is promoted, and irregular vibrations occur due to excessively large torque.

Figure 10:
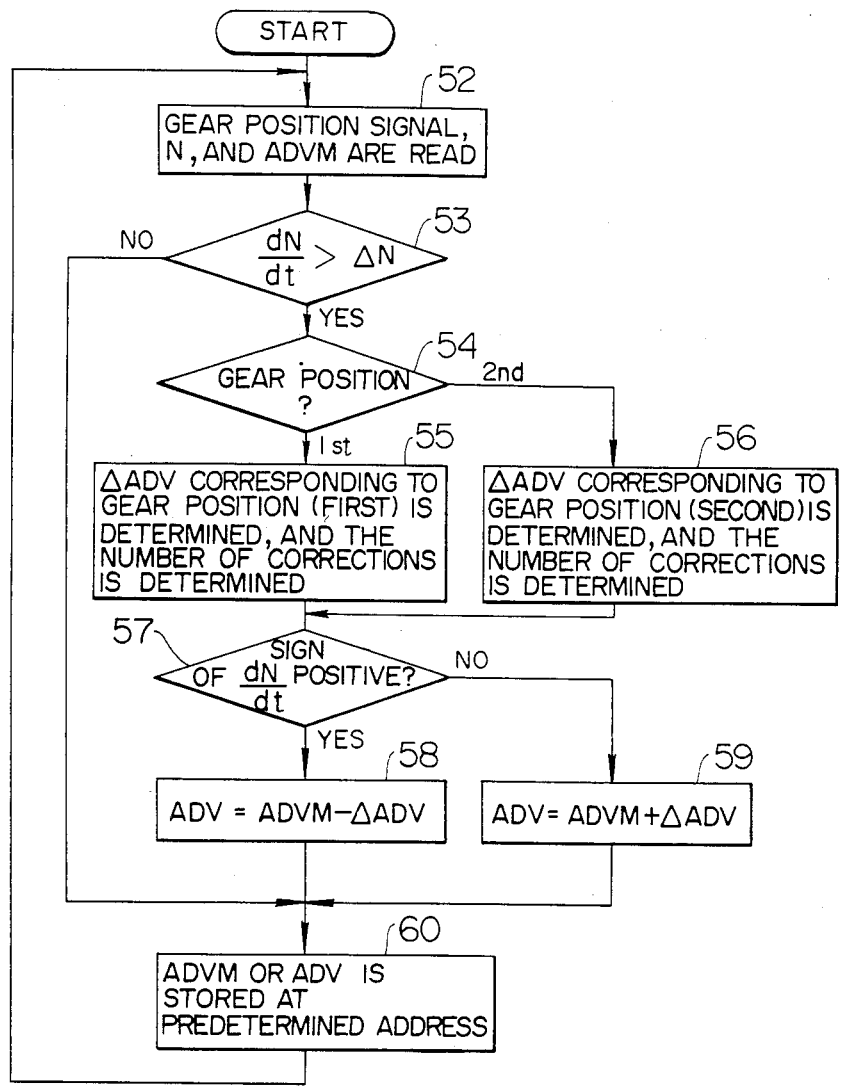
FIGS. 10, 11, 12, 15 and 16 are flowcharts of other embodiments of the present invention.

For this reason, in this embodiment of the present invention, as shown in FIG. 10, it is designed to change the correction amount and the number of corrections such as shown in FIGS. 9A and 9B as examples, depending on the gear position of the vehicle transmission.

With reference to FIG. 10, the operation will be described.

Step 52:

In this step, a gear position signal and an actual engine speed N are read, and a fundamental ignition timing amount ADVM is read from a memory map.

Step 53:

In this step, it is decided whether a change in the engine speed per a predetermined time dN/dt is larger than a predetermined engine speed change ΔN or not.

Step 54:

When the engine speed change dN/dt has been decided as being larger in step 53, in this step, it is decided whether the transmission is in a first gear position or in a second gear position.

Steps 55 and 56:

After the gear position has been decided in step 54, based on this decision, a correction ignition timing amount ΔADV and a number of corrections are decided in correspondence with the gear position.

Step 57:

In this step, it is decided whether a change in the engine speed is positive or negative. That is, a direction of change in the engine speed is decided.

Steps 58 and 59:

In these steps, the correction amount ΔADV obtained in steps 54 to 57 is added to or subtracted from the fundamental ignition timing amount ADVM.

Step 60:

In this step, the final ignition timing amount ADV obtained in steps 58 and 59, or the fundamental ignition timing amount ADVM is stored at a predetermined address.

And, in the control of the ignition timing, as shown in FIGS. 9A and 9B, the correction amount and the number of corrections are changed depending on whether the transmission is in the first or second gear position.

Figure 11:
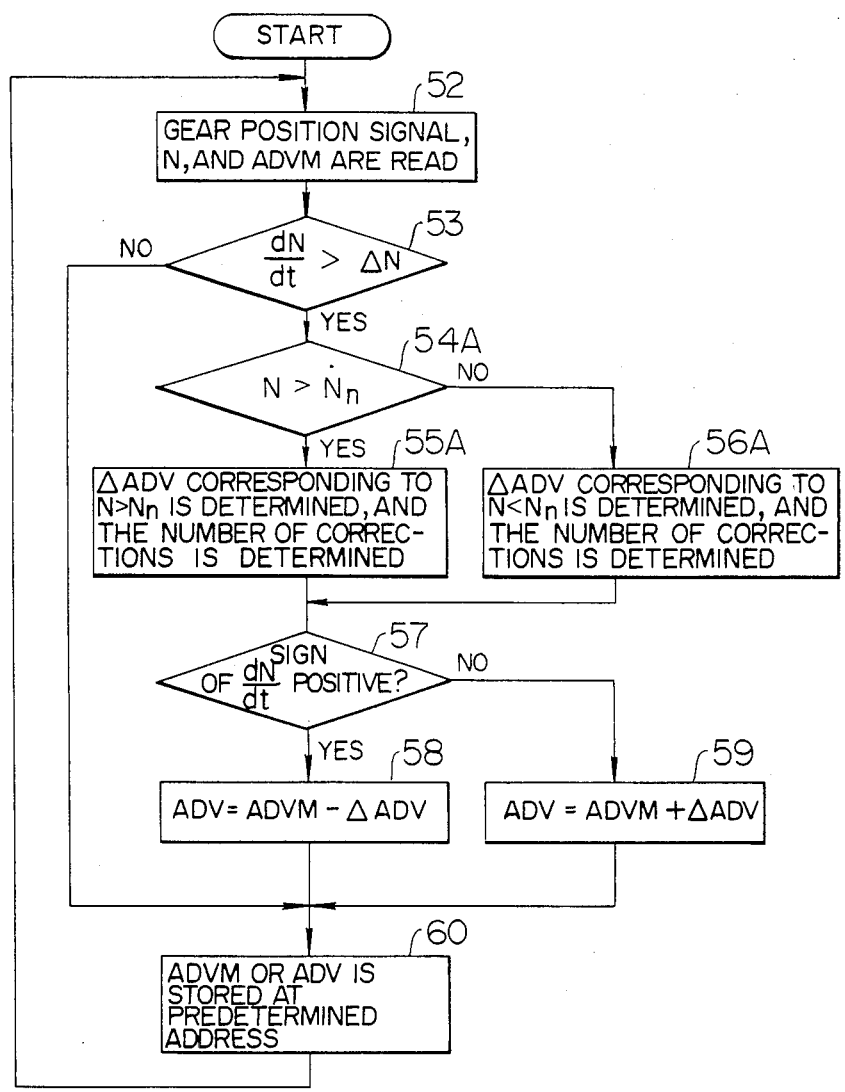

Further, in this respect, the correction amount and the number of corrections may be changed, as shown in FIG. 11, using a predetermined changeover engine speed as a boundary. Such a control will be described with reference to FIG. 11, and the explanation of identical steps to that in FIG. 10 is omitted.

Step 54A:

In this step, it is decided whether the engine speed N is larger than a changeover engine speed $N_n$ or not.

Steps 55A and 56A:

In these steps, a correction amount ΔADV and the number of corrections are determined in a similar manner as in the embodiment of FIG. 10.

In this embodiment, since the correction ignition timing amount and the number of corrections are changed depending on the gear position and the engine speed, the fine and precise control of the ignition timing is made possible, and the vibration suppressing effect can be improved.

Next, a fourth embodiment of the present invention will be described.

In the third embodiment, the correction ignition timing amount is changed from one value to the other in a manner as in switching operation depending on the gear position and the engine speed. In contrast, the fourth embodiment is characterized in that the correction ignition timing amount is changed gradually.

This embodiment will be described with reference to FIG. 12.

Step 61:

In this step, based on outputs from the crank angle sensor and the air flow meter, an engine speed N at the present time is obtained and further, a fundamental ignition timing amount ADVM is obtained from a memory map.

Step 62:

The engine speed N obtained in step 61 is differentiated, and it is decided whether a differentiated value dN/dt is larger than a predetermined value ΔN or not.

Figure 13:
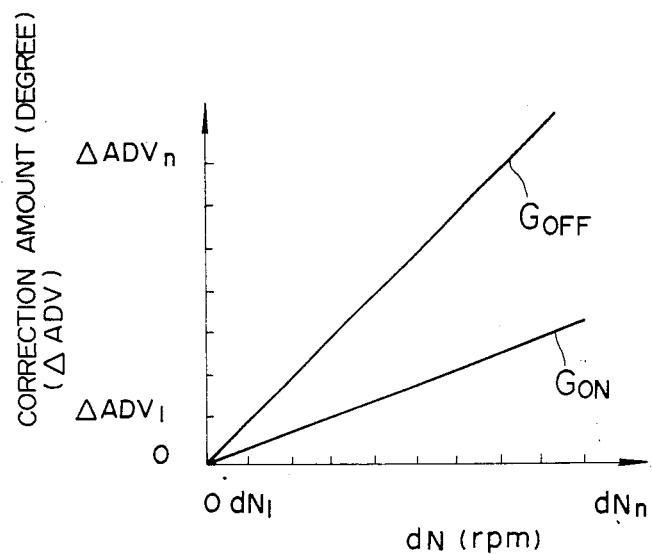
FIG. 13 is a characteristic diagram of an amount of correction with respect to a variation in revolution.

Step 63:

When it is decided in step 62 that the engine speed is changing, the changing rate dN/dt is decided as to its magnitude, and a correction amount ΔADV corresponding to the value is obtained from a memory map having a characteristic as shown in FIG. 13.

Step 64:

It is decided whether the differentiated value dN/dt of the engine speed obtained in step 61 is positive or negative thereby to determine whether the engine speed is in an increasing direction or in a decreasing direction.

Step 65:

When it is decided that the engine speed is in the increasing direction in step 64, the correction amount ΔADV obtained in step 63 is subtracted from the fundamental ignition timing amount ADVM to obtain a final ignition timing amount ADV.

Step 66:

When it is decided that the engine speed is in the decreasing direction, the correction amount ΔADV obtained in step 63 is added to the fundamental ignition timing amount ADVM to obtain a final ignition timing amount ADV.

Step 67:

In this step, the fundamental ignition timing amount ADVM obtained in step 61, and the correction amount obtained in step 65 or 66 are stored at predetermined addresses, and actual ignition control is carried out.

Next, a fifth embodiment will be described in which the fifth embodiment is a modification of the fourth embodiment.

There is a problem in that when the control of the fourth embodiment is carried out in an operating area of the engine in which the ignition timing control is not necessary because of a relationship between the engine speed and the surging, the engine performance is degraded conversely, and the utilization efficiency of the microcomputer is lowered.

Accordingly, in the modified embodiment, it is designed to perform the aforementioned fundamental control only in a predetermined range of the engine speed.

Figure 14:
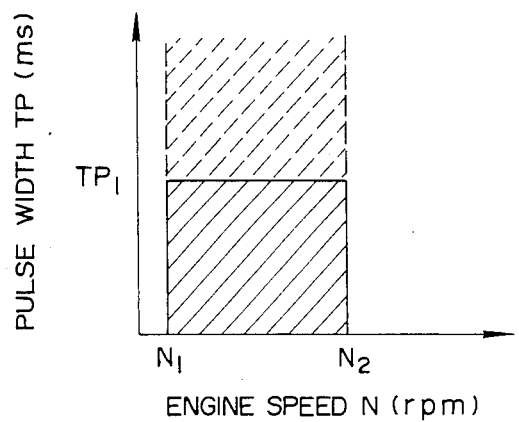
FIG. 14 is a graph for determining a correction area based on the engine speed and load.

In FIG. 14, the ignition timing control is carried out in a range of the engine speed, that is above $N_1$ and below $N_2$. $N_1$ corresponds to about 600 rpm and $N_2$ corresponds to 1200 rpm, and a further condition is that a clutch is meeting.

The reason for selecting $N_1$ as 600 rpm is based on the findings in which at the time when the clutch meets, the engine speed decreases, and thus when the aforementioned fundamental control is carried out, it results in the control for advancing the ignition timing, and the output of the engine to cope with the load is decreased. On the other hand, the reason for selecting $N_2$ as 1200 rpm is that the surging is essentially difficult to occur at the engine speed above 1200 rpm, and when the execution of the fundamental control is continued even at the engine speed above 1200 rpm a control time is needed for the microcomputer superfluously and the utilization efficiency is lowered.

Further, the correction area can be defined also by load. The load is obtained from a pulse width $T_p$ applied to the injection valve, and it is possible to determine that the control is carried out in a range wherein the load is smaller than a predetermined value $T_{P1}$.

Figure 15:
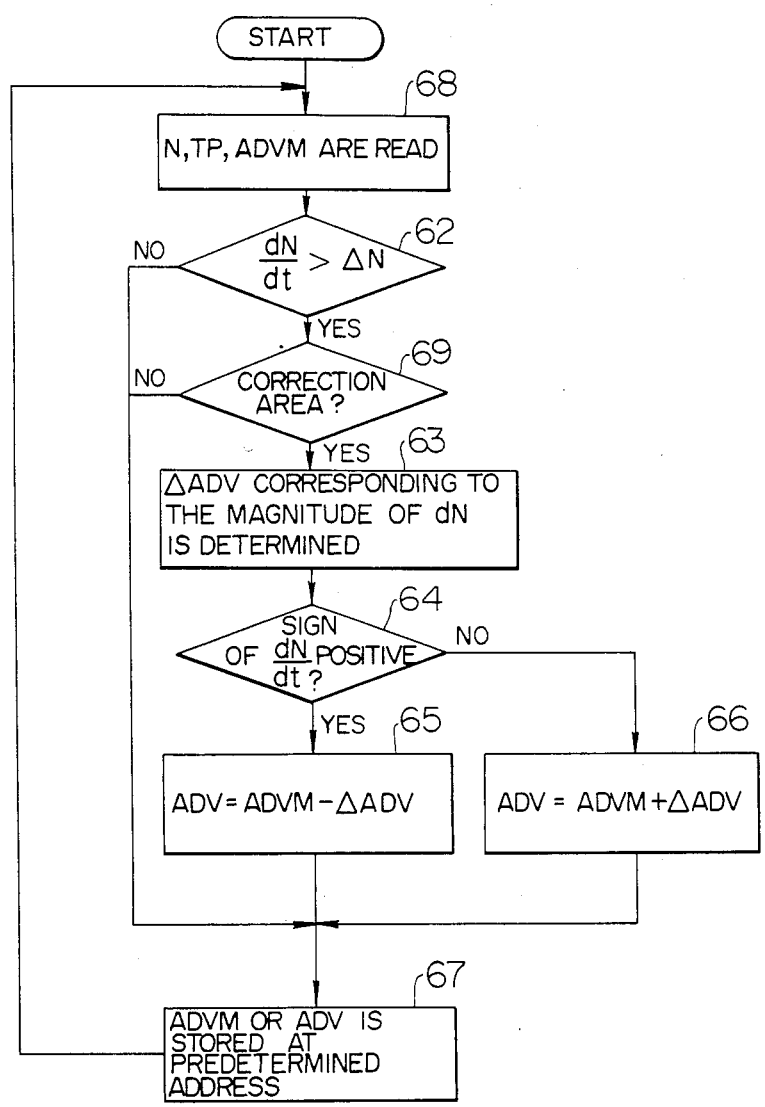

The control mentioned above will be described in detail with reference to a flowchart in FIG. 15 wherein steps bearing identical numerals to that in FIG. 12 indicate identical processings.

Step 68:

In this step, the engine speed N, load $T_P$ and fundamental ignition timing amount ADVM are read.

Figure 12:
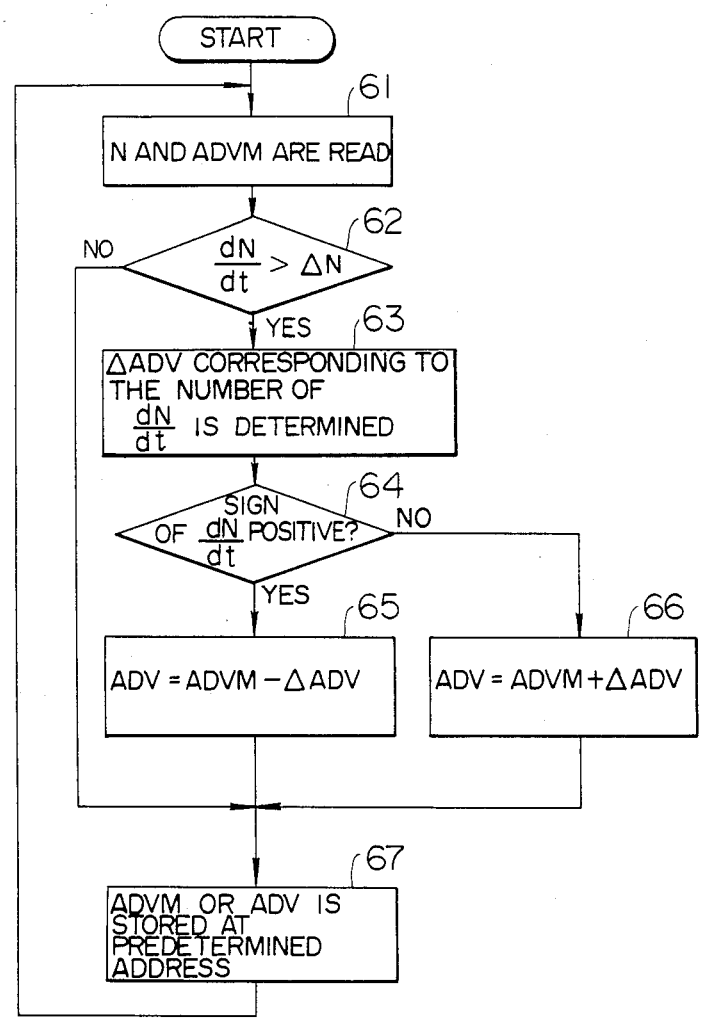

Step 62:

The same processing is carried out as in the step in FIG. 12.

Step 69:

When it is decided that a variation in the engine speed is equal to or larger than a predetermined value in step 62, it is decided in this step as to whether a correction of the ignition timing is really necessary or not.

The conditions for this decision are shown in FIG. 14 in that the ignition timing is corrected when the clutch is engaged and the engine speed N is in the range of $N_1 \leq N \leq N_2$, or further, the ignition timing is corrected when the load $T_P$ is smaller than the predetermined value $T_{P1}$.

Step 63:

When it is decided that the operating parameters are in the correction area in step 69, the same processing as in step 63 in FIG. 12 is performed.

Step 64:

The same processing is performed as in FIG. 12.

Step 65:

The same processing is performed as in FIG. 12.

Step 66:

The same processing is performed as in FIG. 12.

Step 67:

The same processing is performed as in FIG. 12.

In this manner, by setting the correction area, the correction of the ignition timing is carried out only for the really required operating area, and thus the problems of degradation of the engine performance and decrease of the utilization of the microcomputer can be obviated.

[Correction Depending on Gear Position]

The degree of suppression of vibrations due to surging in the engine differs depending on the load on the engine. In other words, even when the change in the engine speed is the same, and hence even when the same correction of the ignition timing is applied, the vibration suppressing effect differs depending on whether the transmission is at a neutral position or at any of the other positions. Thus, when the correction appropriate in the case of the neutral gear position is applied in other cases, the vibration suppressing effect is reduced.

For this reason, by changing the correction amount depending on the gear positions, an optimum vibration suppressing effect can be obtained at the neutral position as well as at the other gear positions.

Figure 16:
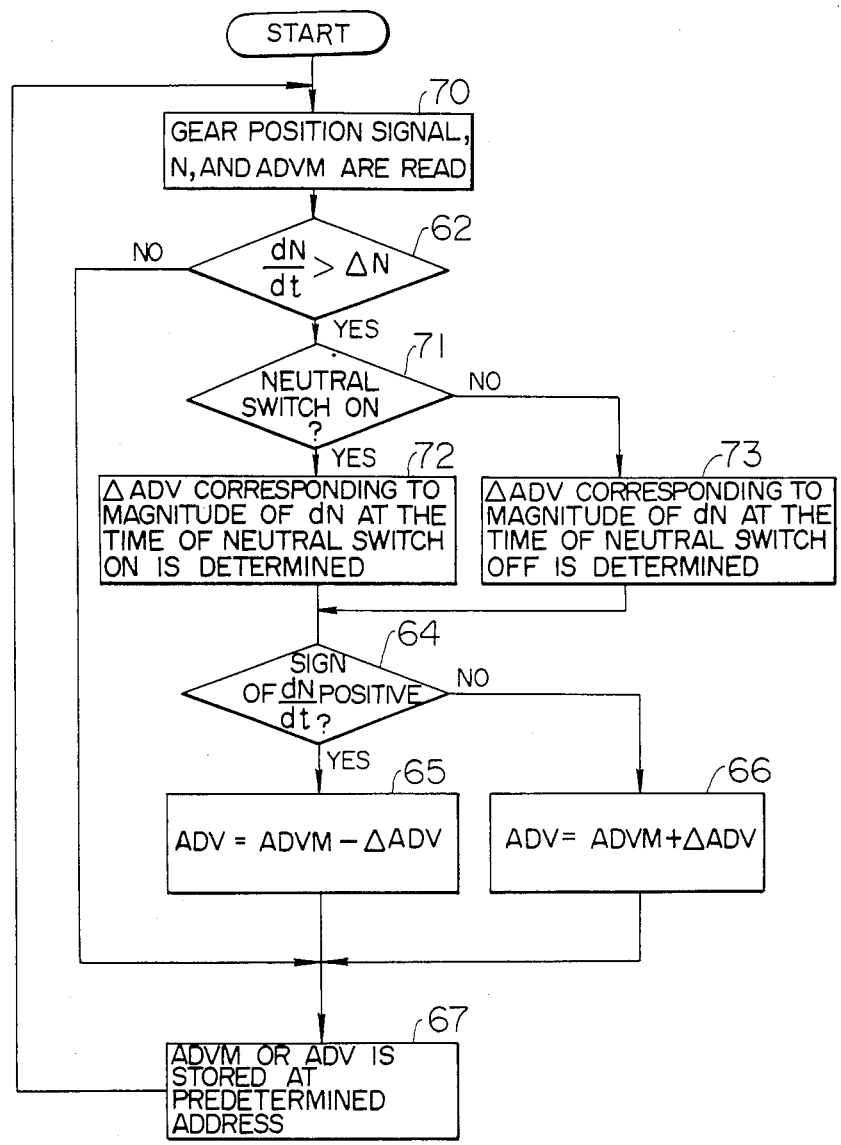

Hereinafter, the operation will be described with reference to a flowchart in FIG. 16.

Step 70:

In this step, the gear position is read from a neutral switch, and further, an engine speed N at the present time and a fundamental ignition timing ADVM are read.

Step 62:

The same processing is carried out as in FIG. 12.

Step 71:

In this step, it is decided whether the neutral switch is at an ON position, that is, a neutral position, or at any of the other gear positions.

Step 72:

When it is decided that the neutral switch is at the ON position in step 71, a correction amount $\Delta ADV$ corresponding to a change in the engine speed dN is obtained from a characteristic curve $G_{ON}$ of the memory map in FIG. 13.

Step 73:

When it is decided that the neutral switch is at an OFF position in step 71, a correction amount $\Delta ADV$ corresponding to the change in the engine speed dN is obtained from a characteristic curve $G_{OFF}$ in the memory map in FIG. 13.

Step 64:

The same processing is carried out as in FIG. 12.

Step 65:

The same processing is carried out as in FIG. 12.

Step 66:

The same processing is carried out as in FIG. 12.

Step 67:

The same processing is carried out as in FIG. 12.

As described in the foregoing, it is decided whether the gear position is at the neutral position or at any of the other gear positions, and depending on this decision, the correction amount is changed even when the change in the engine speed is the same. As a result, an optimum vibration suppressing effect can be obtained.

We claim:

1. A method for controlling ignition timing comprising the steps of:

determining a fundamental ignition timing amount based on an engine operating condition;

determining a direction of change in an engine speed which indicates whether the speed is increasing or decreasing;

determining a correction ignition timing amount based on the direction of change in the engine speed, said correction ignition timing amount having a value which is substantially ineffective at an engine speed in the vicinity of a point at which the direction of change of the engine speed is inverted and is a maximum value at a time point at which the changing rate of the engine speed is maximum; and determining ignition timing by adding or subtracting said correction ignition timing amount to or from said fundamental ignition timing amount.

2. An ignition timing control apparatus for an internal combustion engine, comprising:
  (a) engine speed detecting means for producing an engine speed signal;
  (b) fundamental ignition timing determining means for producing a fundamental ignition timing value on the basis of an operating condition of said engine;
  (c) change rate discriminating means for differentiating said engine speed signal and for determining if the rate of change of engine speed is larger than a predetermined value;
  (d) correction ignition timing means for producing a correction ignition timing value when said rate of change of engine speed is larger than said predetermined value as indicated by said change rate discriminating means;
  (e) change direction determining means for determining the direction of change of said engine speed which indicates whether the speed is increasing or decreasing; and
  (f) final ignition timing determining means for producing a final ignition timing signal corresponding to said fundamental ignition timing valve when said rate of change of engine speed is not larger than said predetermined value and corresponding to said fundamental ignition timing value corrected by said correction ignition timing value in accordance with the direction of change of engine speed when said rate of change of engine speed is larger than said predetermined value, including:
  means for correcting said fundamental ignition timing value by adding said correction ignition timing value thereto when said engine speed is changing in the decreasing direction and by subtracting said correction ignition timing value therefrom when said engine speed is changing in the increasing direction, wherein said correction ignition timing means includes means for counting sequential ignition time periods following detection of a change in the direction of change of engine speed, and means responsive to said counting means for producing correction ignition timing values in a predetermined number of successive ones of said sequential ignition time periods beginning with one of said ignition time periods other than the first ignition time period following detection of a change in the direction of change of engine speed.

3. An ignition timing control apparatus according to claim 2, wherein said correction ignition timing values vary in magnitude during said successive ones of said sequential ignition time periods according to a predetermined pattern.

4. An ignition timing control apparatus according to claim 2, wherein said predetermined number of successive ones of said ignition time periods is different for different ranges of engine speed.

5. An ignition timing control apparatus according to claim 2, further including condition detecting means for detecting when respective transmission gears are engaged, and wherein said correction igniting timing means includes correction amount changing means responsive to said condition detecting means for changing the number of sequential ignition time periods during which the correction ignition timing values are produced for respectively different transmission gears detected by said condition detecting means.

6. An ignition timing control apparatus for an internal combustion engine, comprising:
  (a) engine speed detecting means for producing an engine speed signal;
  (b) fundamental ignition timing determining means for producing a fundamental ignition timing value on the basis of an operating condition of said engine;
  (c) change rate discriminating means for differentiating said engine speed signal and for determining if the rate of change of engine speed is larger than a predetermined value;
  (d) correction ignition timing means for producing a correction ignition timing value when said rate of change of engine speed is larger than said predetermined value as indicated by said change rate discriminating means;
  (e) change direction determining means for determining the direction of change of said engine speed which indicates whether said speed is increasing or decreasing; and
  (f) final ignition timing determining means for producing a final ignition timing signal corresponding to said fundamental ignition timing value when said rate of change of engine speed is not larger than said predetermined value and corresponding to said fundamental ignition timing value corrected by said correction ignition timing value in accordance with the direction of change of engine speed when said rate of change of engine speed is larger than said predetermined value, including:
  means for correcting said fundamental ignition timing value by adding said correction ignition timing value thereto when said engine speed is changing in the decreasing direction and by subtracting said correction ignition timing value therefrom when said engine speed is changing in the increasing direction, further including condition detecting means for detecting when respective transmission gears are engaged and when the transmission is in a neutral condition, and correction amount changing means for changing the magnitude of said correction ignition timing values so that larger values are provided when said transmission is in a neutral condition as detected by said condition detecting means.

7. An ignition timing control apparatus for an internal combustion engine, comprising:
  (a) engine speed detecting means for producing an engine speed signal;
  (b) fundamental ignition timing determining means for producing a fundamental ignition timing value on the basis of an operating condition of said engine;
  (c) change rate discriminating means for differentiating said engine speed signal and for determining if the rate of change of engine speed is larger than a predetermined value;
  (d) correction ignition timing means for producing a correction ignition timing value when said rate of change of engine speed is larger than said predetermined value as indicated by said change rate discriminating means;

(e) change direction determining means for determining the direction of change of said engine speed which indicates whether said speed is increasing or decreasing; and (f) final ignition timing determining means for producing a final ignition timing signal corresponding to said fundamental ignition timing value when said rate of change of engine speed is not larger than said predetermined value and corresponding to said fundamental ignition timing value corrected by said correction ignition timing value in accordance with the direction of change of engine speed when said rate of change of engine speed is larger than said predetermined value, including:

means for correcting said fundamental ignition timing value by adding said correction ignition timing value thereto when said engine speed is changing in the decreasing direction and by subtracting said correction ignition timing value therefrom when said engine speed is changing in the increasing direction wherein said correction ignition timing means includes means responsive to said change rate discriminating means for producing correction ignition timing values having a magnitude proportional to the rate of change of engine speed.

8. An ignition timing control apparatus according to claim 7, further comprising speed range detecting means for detecting when the engine speed is in a predetermined range between an idling speed and a first predetermined engine speed, and wherein said correction ignition timing means is responsive to said range detecting means to produce correction ignition timing values only when the engine speed is in said predetermined range.

9. An ignition timing control apparatus according to claim 7, further including speed range detecting means for detecting when the engine speed is in a predetermined range and load detecting means for detecting engine load, and wherein said correction ignition timing means is responsive to said range detecting means and said load detecting means to produce correction ignition timing values only when the engine speed is in said predetermined range and said engine load is smaller than a predetermined value.

* * * * *